United States Patent [19]

Karran et al.

[11] 4,157,113

[45] Jun. 5, 1979

[54] VENTILATION AND TEMPERATURE CONTROL APPARATUS

[76] Inventors: Frederick J. Karran, Grange Close, Ingrave, Nr. Brentwood, Essex, England; Arthur R. Nisbet, Coynant, Llanfynydd, Carmarthen, Dyfed, Wales

[21] Appl. No.: 791,324

[22] Filed: Apr. 27, 1977

[30] Foreign Application Priority Data

Apr. 27, 1976 [GB] United Kingdom .............. 17059/76

[51] Int. Cl.² ....................... F28F 27/02; B61D 27/00
[52] U.S. Cl. .......................................... 165/42; 62/225
[58] Field of Search ................. 165/35, 41, 42, 16, 165/23; 137/625.46, 625.47

[56] References Cited

U.S. PATENT DOCUMENTS

| | | | |
|---|---|---|---|
| 3,090,396 | 5/1963 | Rudelick | 137/625.47 X |
| 3,183,962 | 5/1965 | Steinhagen et al. | 165/42 X |
| 3,332,218 | 7/1967 | O'Dell | 137/625.46 |
| 3,370,612 | 2/1968 | Holl | 137/625.47 |

*Primary Examiner*—Samuel Scott
*Assistant Examiner*—Theophil W. Streule, Jr.

[57] ABSTRACT

A ventilation and temperature control apparatus for a vehicle has means for producing two different temperature airflows. Valves regulate the mixing of the flows and direct the mixed flows to upper and lower outlets, the valves being controllable interdependently and at least one also being controllable independently. Rotary valves are employed, simplifying sealing problems and also allowing the provision of shaped closure edges to improve control of the flows at small opening settings. A further feature is the provision of means for controlling the temperature of an evaporator for cooling one of the two different temperature airflows to limit dehumidification at higher temperature levels.

12 Claims, 10 Drawing Figures

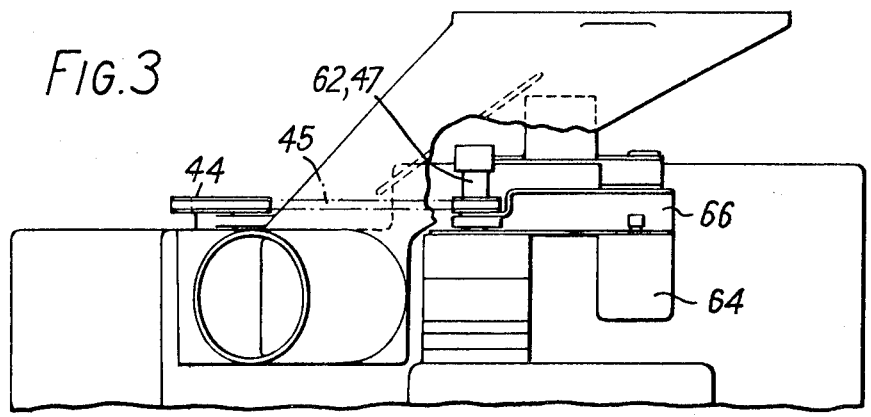
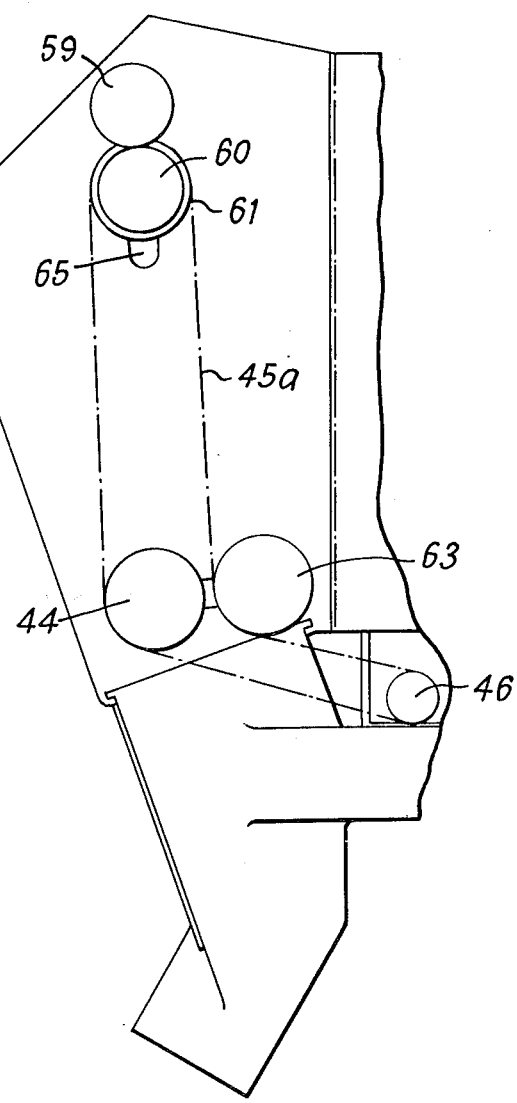

FIG.5
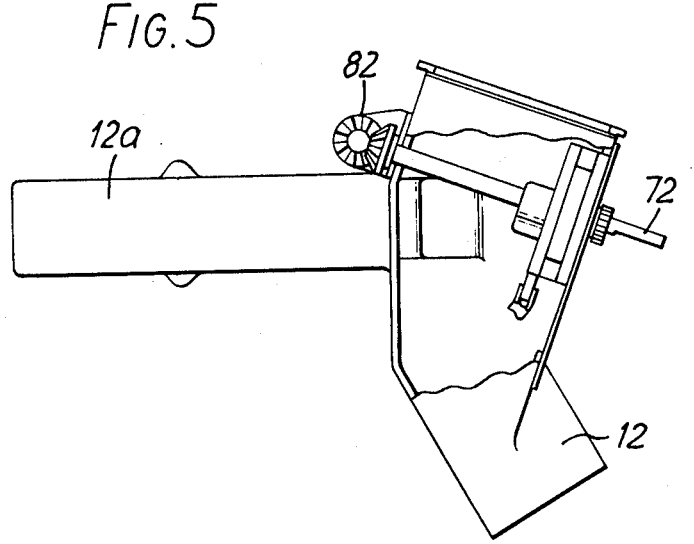
FIG.6
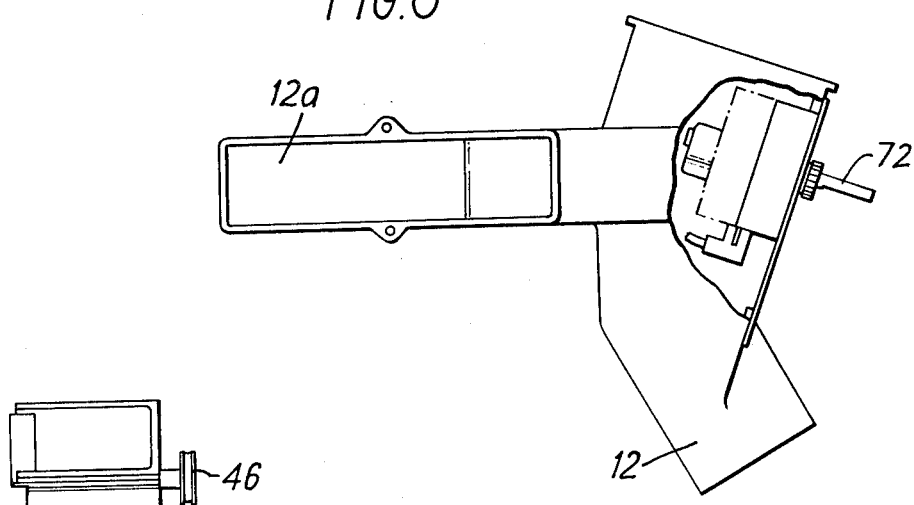
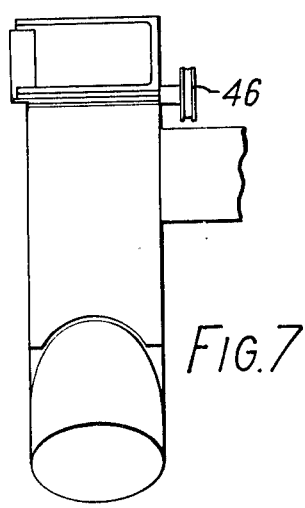
FIG.7
FIG.8
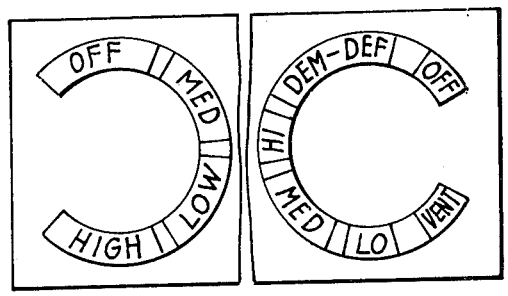

4,157,113

VENTILATION AND TEMPERATURE CONTROL APPARATUS

BACKGROUND OF THE INVENTION

This invention relates to apparatus for ventilation and temperature control of an enclosed space or compartment of a vehicle, such as the driving and/or passenger compartments of cars, lorries, and trucks.

Such apparatus is known in which the flow of air to the compartment is controlled by pivoted flap valves, so that the amount of air can be controlled by said valves, e.g. to control the heating of the compartment. The selective operation of a plurality of such valves is also known from U.S. Pat. Nos. 3,656,541 and 3,948,312 for the purpose of varying the relative flows through two different outlets to different parts of the same compartment.

A disadvantage of such known apparatus using pivoted flap valves, however, is that the forces required to be applied to the valves varies, and in particular a relatively large effort may be required to hold a valve on its seating when it is required to stop the airflow. This problem is increased by the fact that it is usually impossible to arrange that the controlling transmission linkage to the valve is at its most efficient angle when the valve is in the closure position. It is also the case that when the apparatus has a number of such valves that are required to be displaced differently, as for varying the relative flows through two different outlets, the mechanical transmission of the operating movements from a control means that co-ordinates the valve settings can be complicated.

It is, moreover, difficult to obtain sufficiently precise control of such pivoted flap valves at small openings. In a conventional flap valve the relationship between airflow and angular opening setting is not linear, the flow rate increasing very rapidly as the valve begins to open and being little affected by changes of setting at large openings.

SUMMARY OF THE INVENTION

According to the present invention, there is provided a ventilation and temperature control apparatus for an enclosed space or compartment of a vehicle comprising at least one rotary valve provided with entry ports for two different temperature airstreams and a plurality of outlet ports, respective delivery conduits communicating with said outlet ports, said at least one rotary valve having a valve body peripheral face co-operating with the ports and being rotationally adjustable to vary the proportions of the two different temperature airflows admitted by said at least one valve and also to vary the proportions of the mixed flows directed to said delivery conduits.

Advantageously, apparatus according to the invention comprises at least two rotary valves each provided with entry ports for the two different temperature airflows and an outlet port in each of said valves to a respective one of said delivery conduits, there being a common drive means for rotating the valves interdependently of each other. It is possible also, in such apparatus, to provide in a simple manner means for rotating one of the valves independently of the other whereby the relative positions of said valves are adjusted in said interdependent rotation. Such means will thus not prevent the interdependent operation of the valves but can be used simply to adjust the relative starting or end settings of the valves.

This arrangement may be used to advantage if the interdependent operation of the valves is effected by automatic control means, when said independent operation can be under manual control to allow an occupant to modify the operation of the apparatus.

A further advantage that can be obtained from the use of rotary valves is that low rates of flow can be more closely controlled by arranging that the or each valve and/or its ports have closure edges oblique to the axis for rotation of the valve whereby closure is effected in a progressive manner along the length of the valve. A given angular movement of the valve near the closure position thus exposes a smaller flow cross-section occupying only part of the length of the valve. Preferably, where multiple delivery points are fed from the same valve, the delivery conduits are symmetrically arranged with respect to their valve or valves and said oblique closure edges are also symmetrically disposed. It is also possible to form said closure edges so that the total delivery airflow is admitted in different proportions to delivery conduits further downstream.

Sealing of the valves in their closed positions can be achieved in a particularly convenient manner by providing, between the peripheral face of the or each valve and the adjacent face of its housing a thin layer of low-friction material on one of said faces backed by a resilient layer urging said low friction layer into contact with the other of said faces when peripherally coincident with said other face.

It is also advantageous, to avoid non-uniform temperature effects, if the or each valve has mixing vanes projecting inwards of its peripheral sealing face.

According to a further preferred feature of apparatus according to the invention comprising both heating and cooling devices for the airflow has means for directing through the heating device at least a part of the air flow from the cooling device and for controlling the airflow to maintain a desired temperature level in said compartment, and means for varying the cooling device temperature whereby to limit the dehumidification of the airflow therethrough at higher temperature levels.

The invention is illustrated by way of example in the accompanying drawings.

BRIEF DESCRIPTION OF THE DRAWINGS

FIG. 3 is a part view from below of the apparatus of FIGS. 1 and 2 with a slightly modified form of casing, FIG. 4 is an illustration of an altenative drive arrangement for the rotary valve bodies, FIGS. 5 and 6 are part views illustrating a modification of the apparatus of the preceding figures in which the operation of the apparatus is controlled manually, FIG. 7 is a view from the rear of the part of the apparatus shown in FIG. 5, FIG. 8 is a diagrammatic illustration of the control scales for the manually operated arrangement shown in FIGS. 5 to 7, and FIGS. 9 and 10 are schematic sectioned views, in planes X—X and Y—Y at right-angles to each other, of a modified form of rotary valve for use in apparatus according to the invention.

DESCRIPTION OF THE PREFERRED EMBODIMENTS

Figure 1:
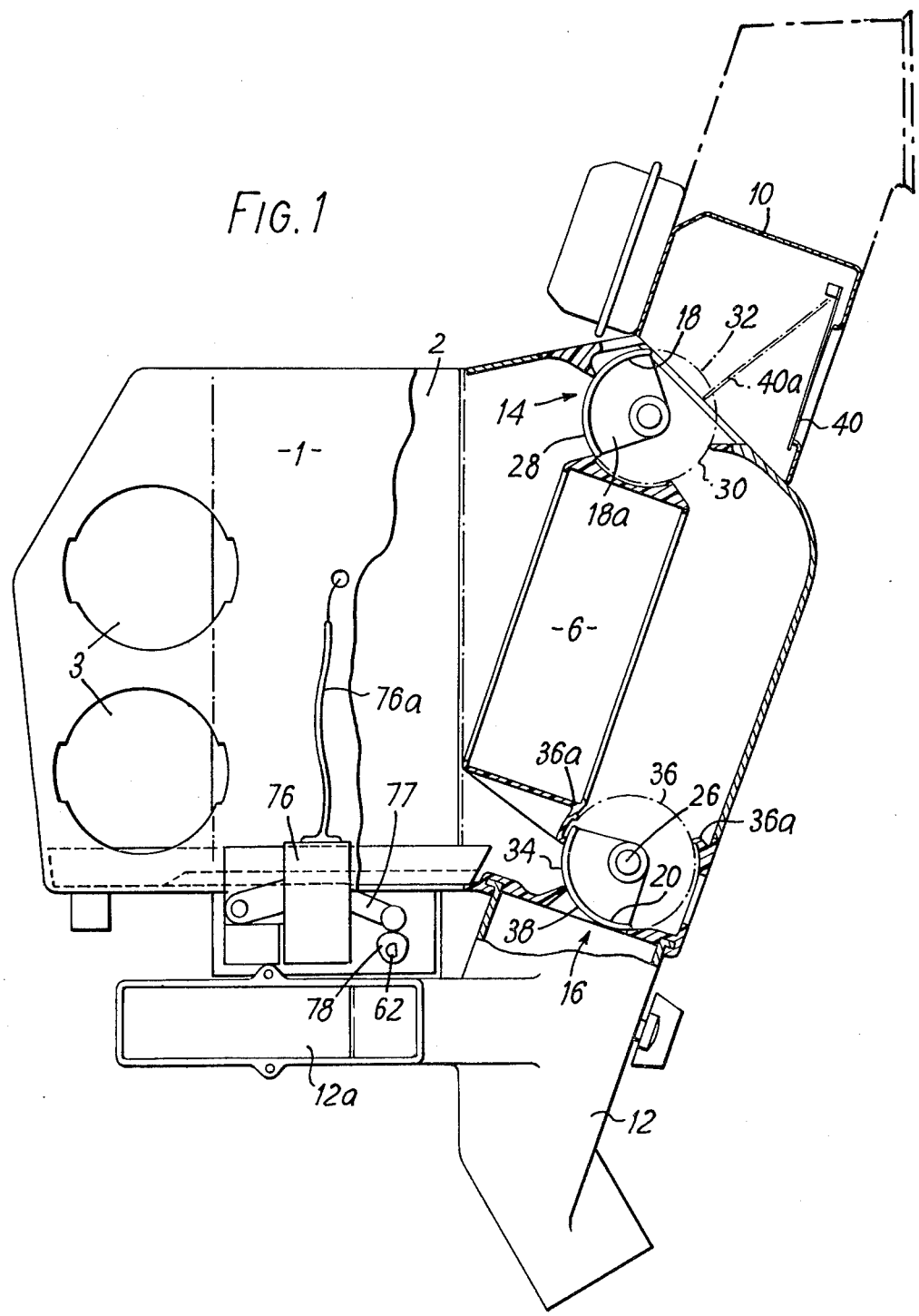
FIG. 1 is partly sectioned side view of an apparatus according to the invention intended for a private passenger vehicle interior.

The apparatus shown in the drawings is similar in many respects to that described and illustrated in U.S. Pat. No. 3,948,312 and can be similarly controlled so that reference can be made to that specification for features of the servo control system not shown here.

Like that earlier apparatus, a casing 1 contains an evaporator 2 forming part of a refrigeration unit, air being driven by fans (only the discharge openings 3 for which are shown) through the evaporator and a condensate trap (not shown). Immediately downstream of the condensate trap is a heater 6 for taking heat in known manner from cooling water from an internal combustion engine powering the vehicle.

Upper and lower outlet manifolds 10, 12 of the casing (the upper manifold being shown only in FIG. 1) for the air flow through the casing have the respective flows through them controlled by upper and lower rotary valves 14, 16. Each valve comprises a cylindrical sector-form valve body 18, 20 respectively, rotatable about axis 24 or 26. The upper valve 14 is able to control the opening of inlet ports 28, 30 and outlet port 32 to the manifold 10. The port 28 communicates directly with the area downstream of the evaporator to provide a cooled airstream and the port 30 is placed downstream of the flow from the heater so that it admits a heated airstream. The lower valve 16 similarly has an inlet port 34 for cool air and an inlet port 36 for heated air, with outlet ports 38 to the divided outlet manifold 12 on opposite sides of the casing, and it will be clear that the angular setting of the valve body in each instance will determine the proportions of heated and cooled air discharge to the associated outlet manifolds.

Figure 9:
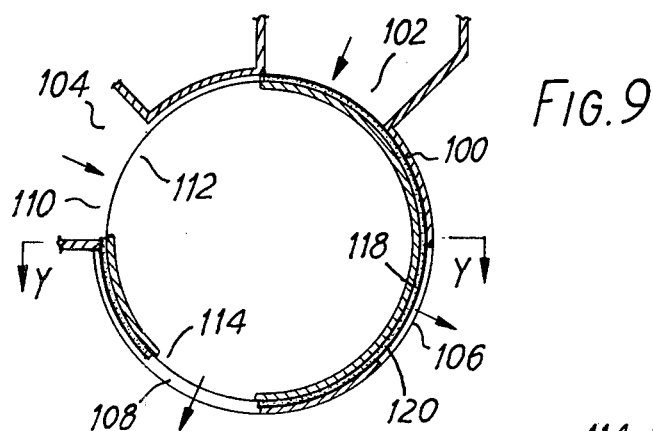
Figure 10:
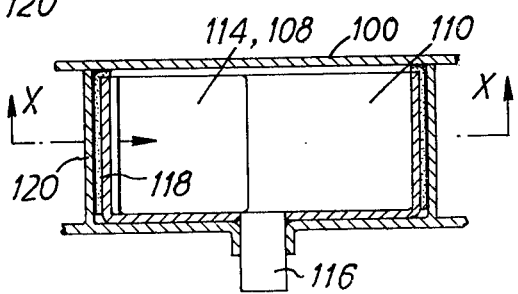

To provide a suitable seal with the rims or flanges of the porting, each valve body has its outer peripheral face covered by a thin layer of relatively low-friction material, such as nylon, and has under this a resilient layer, e.g. polyurethane foam, that will urge the surface layer yieldably into contact with the porting flanges. These seals are illustrated in FIGS. 9 and 10. They may be constructed in a variety of materials and may be on the porting flanges, as at 36a—instead of on the valve bodies. At least the upper valve has mixing vanes 18a projecting radially inwardly on the valve body to assist thorough mixing of the heated and cooled airstreams in the outlet manifold.

Figure 2:
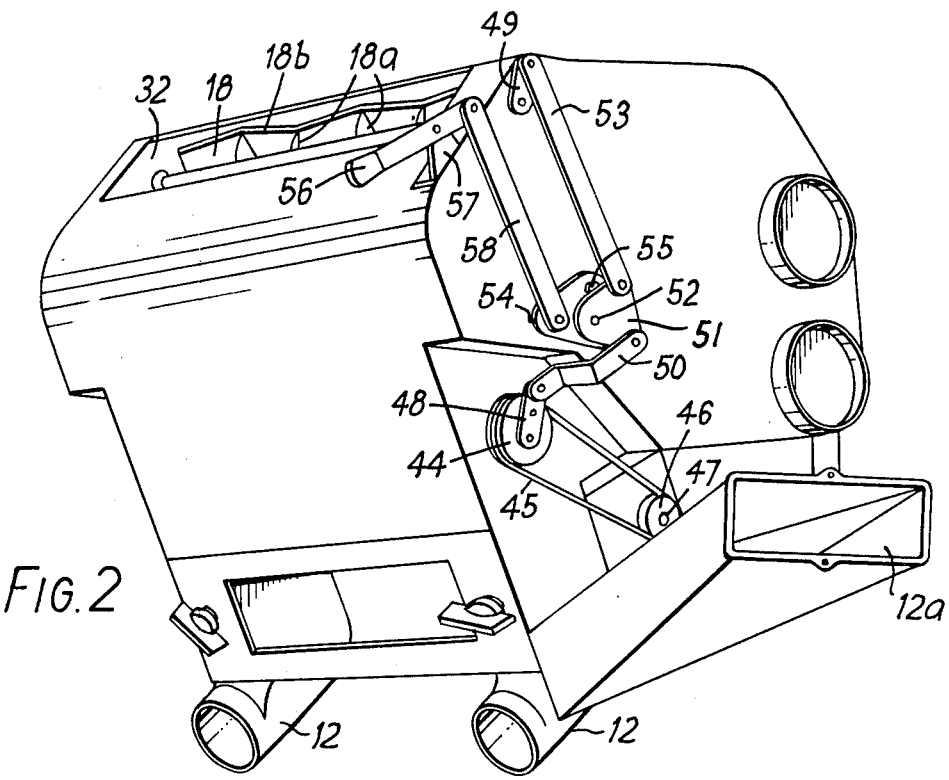
FIG. 2 is a perspective view of the apparatus in FIG. 1 but with the upper manifold removed.

Preferably the closure edges of each valve body extend slightly obliquely to the flanges of the associated porting, as illustrated at 18b in FIG. 2, so that near the fully closed position of each port, an aperture is formed over a progressively changing axial length and there is a more gradual opening and closing of the port. This allows better control of the airflow at small valve openings and the peak torque on the valve body, especially when closing, is reduced, and it will be understood that to obtain this effect the valve body edges and the closure edges of the porting flanges can be oblique to the rotary axis of the valve body. Preferably the oblique formation is generally symmetrical over the axial extent of the valve body if the exits from the outlet manifold are similarly symmetrically disposed, so that similar temperature and flow conditions are obtained at laterally opposite regions of the outlet manifold at small opening settings when the valve aperture extends over only part of the axial length of the valve. The formation of the closure edges can also be so shaped as to influence the proportions of the airflow delivered to different outlet conduits fed from the same manifold, e.g. favouring the side outlets from the manifold at small opening settings in the configuration shown whereby at such settings a larger proportion of the airflow will pass through side outlets.

The distribution of the air flows from the respective manifolds may be performed in a similar manner to that described in the specification of the aforementioned U.S. Pat. No. 3,948,312. Thus, there is a face-level ventilation flap valve 40 in the upper manifold 10 operated in dependence on whether the upper level discharge is to be directed onto the screen or onto the occupants, and distribution trunking (not shown) from the upper manifold with further valves, e.g. to the screen and to side vents in the fascia panel. Associated with the side extensions 12a of the lower manifold 12 there may be trunking extending rearwards of the driver's seat if rear-seat passengers are to have a direct supply of foot-level air.

Means are provided to allow the relative proportions of the mixed flows of heated and cooled air in the upper and lower manifold to be varied differently from each other. The drive mechanism by which this is achieved is shown in FIG. 2. On the spindle of the lower valve body 20 there is a toothed wheel 44 connected by a toothed belt 45 to a drive wheel 46 on shaft 47. The wheel 44 carries a crank 48 connected to a crank 49 on the spindle of the upper valve body 18 by a linkage comprising a first link 50, a pivot plate 51 mounted on a pivot 52, and a second link 53. Rotation of the drive gear 46 thus rotates both valve bodies in opposite directions.

In addition, the pivot plate 51 is connected only indirectly to the casing, its pivot 52 being on a carrier plate 54 that is itself pivoted to the casing at 55. A lever 56 pivoted on a bracket 57 fixed to the casing is connected by a further link 58 to the carrier plate, so that movement of the lever to pivot the carrier plate 54 will also pivot the plate 51, and with it the crank 49 and upper valve body 14, independently of the lower valve body. Thus, with the drive belt and the lower valve body 20 stationary, operation of the lever will cause the upper valve body 18 to rotate in one direction or the other advancing or retarding the valve setting in relation to the setting of the lower valve. In other words, the relative temperatures of the air discharge at upper and lower levels can be varied by this adjustment.

There is also scope for varying the relative proportions of hot and cold air through one outlet manifold as compared with the other, in a manner that is controlled by the movement of the drive wheel 46, by suitable choice of the angular extents and positions of the valve porting and the valve bodies, and by choice of the ratio of angular movements of the upper and lower valve bodies by the drive wheel. In this connection also ventilation flap 40 is displaceable from a closed position to a fully open position 40a to increase the proportion of the outflow delivered to face level, as would be required when the apparatus is operation in a cooling mode.

The ventilation flap 40, the drive wheel 46 and the lever 56 can be manually controlled or can be controlled by a servo control system as described in U.S. Pat. No. 3,948,312 through similar mode and temperature controls. In the example of FIGS. 1 to 3, the flap and drive wheel are automatically operated but the lever 56 is adjusted manually, for example when it is required to adjust the temperature difference between the upper and lower level discharges. As may be seen in FIGS. 1 and 3 in particular, the automatic control arrangement comprises a rotary cam shaft 62 which can be fixed to or form part of shaft 47 and it will be noted that co-ordinated movement of the valve bodies can be obtained simply by the rotation of the two spindles on which they are mounted, so simplifying the transmission of the control drive thereto. Moreover, it is possible to obtain the movements with a substantially constant torque load whereas lever flap valves each require an increased force at the end of their travel to obtain adequate sealing, although it is convenient in the present example to use such a valve 40 also.

The apparatus also includes an adjustable thermostat 76 of a commercially known type with capillary sensing element 76a, for controlling the evaporator temperature. The thermostat has an adjustment lever 77 the setting of which is determined by a cam 78 on the cam shaft 62, which has the effect of automatically raising the evaporator temperature at positive heating settings of the cam shaft. The purpose of this arrangement is to retain more of the moisture content in the throughflow of air at higher temperatures.

If an evaporator thermostat is set to a temperature immediately above freezing point, the airflow from the evaporator will have about 100% relative humidity at that temperature but when the air temperature is then raised its relative humidity reduces sharply. Thus, at such a setting the evaporator may produce air that is uncomfortably dry when the air temperature is raised to substantially higher values. By adjusting the evaporator temperature upwards when the air is subsequently required to be heated to an outlet temperature in the upper part of the range obtainable from the apparatus, more of the original moisture content is retained in the air after it has passed through the evaporator and a more comfortable relative humidity can be obtained in the outlet airflow.

FIG. 3 in the accompanying drawings illustrates the location of the cam shaft 62 on the casing, as well as its drive motor 64 with reduction drive gear 66. A feedback potentiometer of the servo system (operating as described in the specification of the earlier U.S. patent already referred to) can be on the opposite side of the casing to the belt 45 and have its movable part mounted directly on the lower valve body spindle, but it can be placed elsewhere, e.g. on the upper valve body spindle, or on the cam shaft itself.

The arrangement of the electrical and vacuum switches on the servo motor assembly is generally similar to that described in the earlier U.S. patent and preferably, for economy of manufacture, the vacuum switches are of labyrinth construction and the electrical switches comprise printed circuits.

FIG. 4 illustrates an alternative operating mechanism for the valve bodies 18, 20 in which respective toothed gear wheels 44, 59 are mounted on the lower and upper valve body spindles respectively. The upper wheel 59 meshes with a further gear wheel 60 that is fixed to a gear wheel 61 connected to the gear wheel 44 by a tooth belt 45a that, as before, passes round the drive wheel 46. The tension of the belt is maintained by a spring-loaded idler wheel 63. As before, rotation of the drive wheel will cause rotation of both valve bodies in opposite directions. The pair of wheels 60, 61 is mounted on a link arm 65 that is itself pivoted on the axis of the upper valve body 18 and a control member (not shown) is connected to the lower end of the link arm to pivot the gear pair about the upper valve body axis. The upper valve body can thus be rotated independently of the drive belt and the lower valve body to cause relative advance or retardation of the valve settings in the same way as the first-described example.

FIGS. 5 to 8 illustrate details of an alternative, manual control arrangement, operating without cooling means (i.e. the evaporator 2 could be omitted) and in which the settings are obtained by two rotary knobs on the vehicle dash, mounted on spindles 72 (FIG. 5) and 74 (FIG. 6). The dial indicator scales associated with these knobs are shown in FIG. 8.

The left-hand knob, which in the automatic arrangement would control a potentiometer for varying the setting of the camshaft 62 through the motor 64, now controls the airflow. It has an off position in which there is no airflow through the apparatus, i.e. the fans are isolated from their electrical supply (which may alternatively be achieved using the righthand knob) and either the valve bodies are in positions blocking all airflow or a vacuum-switch control operating a valve (not shown) at the entry to the fans is de-energised to close the valve and so prevent air entering due to ram effect when the vehicle is travelling at speed. (Similar provision is of course made for blocking the flow in an off position with the automatic control arrangement and there the valve closure can be arranged to cause recirculation of the air in the compartment).

The left-hand spindle 72 also has three fan speed settings, namely low, medium and high. Accordingly, with hot water from the engine cooling system flowing through the heater, for a given setting of the rotary valves a greater or lesser amount of heat is carried by the airflow from the unit, in dependence upon the fan speed setting.

The right-hand spindle 74 determines the proportions of the airflows that go through and that bypass the heater matrix as well as the proportions of the upper and lower level discharges. It also has an off position in which it may act to close a stop valve (not shown) in the heater water circuit, although such a valve will not necessarily be provided. The spindle 72 extends to a pair of bevel gears 82 on the output shaft 84 of which there is the drive wheel 46 of the toothed belt 45 that rotates the flap valves 14, 16. Turning the knob anticlockwise from the off position opens the heater water valve, if such a valve is provided, and the first setting reached is a demist-defrost position at which the valves are set so that the heater bypass ports are blocked and only heated air can escape from the upper manifold 10 while the lower manifold 12 is closed.

The knob of the spindle 74 can be rotated further through a series of settings graduating between high temperature and low temperature discharge. In these different settings the proportions of the discharge between the upper and lower exit manifolds may be arranged to vary so that the proportion discharged from the lower manifold decreased as the temperature reduces and the proportions of heated air reaching each manifold may be arranged to vary so that at high temperature settings, for example, the output through the upper manifold is at a lower temperature than the output through the lower manifold. The user is also able to pivot the lever 56 or the link arm 65 of the upper valve body by a separate manual control (not shown) so as to modify this effect, or the link arm position may be determined by adjustment in the garage.

There is also a ventilation position at the extreme position of anticlockwise adjustment of the control spindle 74 where only unheated bypass air reaches the outlet manifolds and the heater water control valve, if any, is closed, but the flap valve 40 is fully opened to allow a maximum flow of fresh air from the fans to face level.

The first-described automatically operated arrangement can be constructed without cooling means, as in the manually controlled arrangement just described, obtaining temperature control by mixing ambient temperature and heated airstreams. It will be clear without further detailed description that it is possible, analogously, to provide a manually controlled apparatus with a refrigeration unit that has a cooling evaporator if air conditioning is required, and with an adjustable evaporator operating temperature also if desired.

FIGS. 9 and 10 illustrate an alternative rotary valve that can be incorporated in apparatus according to the invention. This is principally distinguished by the provision of multiple outlet ports as well as multiple inlet ports and in the arrangement shown hot and/or cold air through inlet ports 102, 104 of a casing 100 can be directed through either or both outlet ports 106, 108 that communicate with screen and foot level outlets respectively, drum-like rotary valve 110 having peripheral openings 112, 114 that register with the casing ports in the required sequence and pattern to give appropriately controlled proportions of hot and cold air through the two outlet ports. Such a construction can reduce the number of separate valves required, since in the preceding examples described the airflow is distributed from the rotary valves to foot level, face level and screen by the use of additional valves.

The relatively short axial length of the valve shown in FIG. 10 is suitable for an arrangement in which valves are disposed adjacent opposite sides of the apparatus so that two spaced outputs can be produced that may, if desired, be controlled separately of each other by independent rotation of the spindle 116 of each valve. FIGS. 9 and 10 also illustrates the sealing means provided in the manner described above between a valve body and the adjacent faces of the valve casing, comprising a soft resiliently yielding underlayer 118 for a low friction surface layer 120.

It will be understood that a valve of the form shown in FIGS. 9 and 10, with its multiple inlets and outlets, can be used simply in ventilation and temperature control apparatus according to the invention to vary the proportions of the two different temperature airflows admitted to the valve and also to vary the proportions of the mixed flows directed to the delivery conduits.

What is claimed is:

1. A ventilation and temperature control apparatus for an enclosed space or compartment of a vehicle having means for heating and cooling and comprising, in combination, respective airflow conduit means for two different temperature airflows, a plurality of rotary valves for controlling and mixing said airflows, said valves each comprising inlet porting communicating with said airflow conduit means for admitting the different temperature airflows to the valve, respective delivery conduits for the mixed flows from said plurality of valves and outlet porting of the valves communicating with said conduits, each of said valves comprising a valve body having a peripheral face co-operating with said porting of the valve and means for rotationally adjusting said valves relative to said porting for varying the proportions of the two different temperature airflows admitted by the valve for mixture and also for varying the proportions of the mixed flows directed to said delivery conduits of the valves, said means for rotationally adjusting said valves comprising first operating means connected to said plurality of valves to effect said adjustment of the plurality of valves interdependently, and second operating means connected to at least one of said plurality of valves to effect adjustment of said at least one valve independently of the relative positions of the valves in said interdependent rotational adjustment.

2. Apparatus according to claim 1 wherein at least one of said valves comprises a rotary body, adjustment means being connected thereto for relative adjustment between the body and the valve ports, said ports being elongate relative to the rotary axis of the valve and substantially coterminus with the valve body, closure edges on the body and the valve ports determining the closure of the ports with said relative rotary adjustment, at least one closure edge having at least a portion of its length oblique to the axis of rotational adjustment, whereby opening and closure is effected in a progressive manner axially of the valve.

3. Apparatus according to claim 1 wherein the rotary body of at least one of said valves comprises airflow mixing vanes projecting inwards of said peripheral face.

4. Apparatus according to claim 1, wherein said second operating means comprises manual means for said independent operation of said one valve.

5. Apparatus according to claim 1 comprising co-operating valve body and valve housing peripheral sealing faces in each rotary valve, a thin layer of low-friction material on one of said faces a resilient layer backing said low-friction layer and urging said low-friction layer into contact with the other of said faces when peripherally coincident with said other face to provide sealing engagement between said faces.

6. Apparatus according to claim 1 wherein said heating and cooling means provides for said different temperature airflows, said conduit means directing through the heating device at least a part of the flow from the cooling device, and control means controlling the airflows to maintain a desired temperature level in said space or compartment, said control means further comprising means for varying the temperature of the cooling device whereby to limit the dehumidification of the flow therethrough at higher temperature levels.

7. A ventilation and temperature control apparatus for an enclosed space or compartment of a vehicle having means for heating and cooling and comprising, in combination, respective airflow conduit means for two different temperature airflows, at least one rotary valve for controlling and mixing said airflows, a rotary adjustment axis for said valve, porting of said valve being of elongate form in a direction parallel to said axis, said porting comprising at least one inlet port communicating with said airflow conduit means for admitting the different temperature airflows to said valve and a plurality of outlet ports for the mixed flow through said at least one valve, respective delivery conduits communicating with said outlet ports, said at least one valve comprising a rotary valve body having a peripheral face rotationally adjustable relative to said porting, closure edges on said peripheral face of the valve body and said porting co-operating to determine the opening and closure of the ports with said relative rotational adjustment, at least one closure edge having at least a portion of its length oblique to said rotary adjustment axis whereby opening and closure is effected in a progressive manner axially of the valve, and means for controlling said rotational adjustment for varying the proportions of the two different temperature airflows admitted by the valves for mixture and also for varying the proportions of the mixed flows directed to said delivery conduits.

8. Apparatus according to claim 7 wherein there are at least two rotary valves, entry ports in each of said valves for the two different temperature airflows and an outlet port in each of said valves to a respective one of said delivery conduits, said adjustment means comprising means connected to the valves for rotating the valves interdependently.

9. Apparatus according to claim 8 further comprising means provided for rotating one of the valves independently of the other whereby the relative positions of said valves are adjusted in said interdependent rotation.

10. Apparatus according to claim 7 wherein said delivery conduits are symmetrically arranged with respect to said at least one valve and said at least one oblique closure edge is also symmetrically arranged thereto.

11. Apparatus according to claim 7 wherein said oblique edges are arranged to vary the relative proportions of the airflow through respective delivery conduits fed by these valves.

12. A ventilation and temperature control apparatus for an enclosed space or compartment of a vehicle having means for heating and cooling and comprising, in combination, respective airflow conduit means for two different temperature airflows, at least one rotary valve for controlling and mixing said airflows, said at least one valve having porting comprising at least one inlet port communicating with said airflow conduit means for admitting the different temperature airflows to said valve and a plurality of outlet ports for the mixed flow through said at least one valve, respective delivery conduits communicating with said outlet ports, said at least one valve comprising a housing and a rotary valve body within said housing, an outer peripheral face on the valve body and an inner peripheral face on the housing, said peripheral faces being disposed concentrically and opposed to each other, said inlet and outlet ports being provided in said housing peripheral face, said outer peripheral face of the valve body co-operating with said ports, sealing means between said valve body and housing at their opposed peripheral faces for providing sealing between said ports, said sealing means comprising a thin layer of low-friction material on one of said opposed peripheral faces, a resilient layer backing said low-friction layer and urging said low-friction layer into contact with the other of said opposed peripheral faces, whereby to provide sealing engagement between the valve body and the housing at said faces, the valve body being rotationally adjustable relative to the housing to open and close said ports for controlling the different temperature airflows admitted to the valve and the mixed flows directed to the delivery conduits.

* * * * *